(12) United States Patent
Goodman et al.

(10) Patent No.: US 11,087,163 B2
(45) Date of Patent: Aug. 10, 2021

(54) NEURAL NETWORK-BASED OPTICAL CHARACTER RECOGNITION

(71) Applicant: Vannevar Labs, Inc., Palo Alto, CA (US)

(72) Inventors: Daniel Goodman, Mountain View, CA (US); Nathaniel Honka, Mountain View, CA (US); Eleony Moorhead, Palo Alto, CA (US); Nathanial Hartman, Oakland, CA (US); Brett Granberg, Palo Alto, CA (US)

(73) Assignee: Vannevar Labs, Inc., Palo Alto, CA (US)

( * ) Notice: Subject to any disclaimer, the term of this patent is extended or adjusted under 35 U.S.C. 154(b) by 0 days.

(21) Appl. No.: 17/085,837

(22) Filed: Oct. 30, 2020

(65) Prior Publication Data

US 2021/0133476 A1 May 6, 2021

Related U.S. Application Data

(60) Provisional application No. 62/929,648, filed on Nov. 1, 2019.

(51) Int. Cl.
*G06K 9/34* (2006.01)
*G06K 9/42* (2006.01)
(Continued)

(52) U.S. Cl.
CPC .............. *G06K 9/342* (2013.01); *G06K 9/42* (2013.01); *G06K 9/6256* (2013.01);
(Continued)

(58) Field of Classification Search
CPC ........ G06K 9/342; G06K 9/6269; G06K 9/42; G06K 9/6256; G06K 2209/01; G06N 3/0445
See application file for complete search history.

(56) References Cited

U.S. PATENT DOCUMENTS 5,848,184 A * 12/1998 Taylor ................ G06K 9/00463
382/173
9,292,739 B1 3/2016 Gray et al.
(Continued)

OTHER PUBLICATIONS

International Search Report in International Application No. PCT/US2020/058321, dated Feb. 2, 2021.

*Primary Examiner* — Xuemei G Chen
(74) *Attorney, Agent, or Firm* — Cognition IP, P.C.; Edward Steakley

(57) ABSTRACT

Methods, systems, and apparatus, including computer programs encoded on computer storage media, for neural network-based optical character recognition. An embodiment of the system may generate a set of bounding boxes based on reshaped image portions that correspond to image data of a source image. The system may merge any intersecting bounding boxes into a merged bounding box to generate a set of merged bounding boxes indicative of image data portions that likely portray one or more words. Each merged bounding box may be fed by the system into a neural network to identify one or more words of the source image represented in the respective merged bounding box. The one or more identified words may be displayed by the system according to a standardized font and a confidence score.

20 Claims, 15 Drawing Sheets

(51) Int. Cl.
  *G06K 9/62* (2006.01)
  *G06N 3/04* (2006.01)
(52) U.S. Cl.
  CPC ......... *G06K 9/6269* (2013.01); *G06N 3/0445*
    (2013.01); *G06K 2209/01* (2013.01)

(56) References Cited

U.S. PATENT DOCUMENTS

| | | | | |
|---|---|---|---|---|
| 9,576,196 | B1* | 2/2017 | Natarajan | G06K 9/3258 |
| 10,423,852 | B1* | 9/2019 | Sarraf | G06K 9/6267 |
| 10,445,569 | B1* | 10/2019 | Lin | G06F 40/279 |
| 2002/0102022 | A1* | 8/2002 | Ma | G06K 9/00456 |
| | | | | 382/170 |
| 2003/0198386 | A1* | 10/2003 | Luo | G06K 9/325 |
| | | | | 382/199 |
| 2006/0078200 | A1* | 4/2006 | Koyama | G06K 9/00456 |
| | | | | 382/181 |
| 2007/0160295 | A1* | 7/2007 | Wang | G06K 9/00456 |
| | | | | 382/199 |
| 2012/0128210 | A1* | 5/2012 | Zobel | G06K 9/00818 |
| | | | | 382/103 |
| 2014/0023271 | A1* | 1/2014 | Baheti | G06K 9/4642 |
| | | | | 382/171 |
| 2014/0257789 | A1* | 9/2014 | Zaric | G06K 9/00463 |
| | | | | 704/8 |
| 2015/0063700 | A1* | 3/2015 | Soundararajan | G06K 9/344 |
| | | | | 382/182 |
| 2016/0034441 | A1* | 2/2016 | Nguyen | G06F 40/137 |
| | | | | 715/234 |
| 2016/0210533 | A1* | 7/2016 | Kiapour | G06Q 30/00 |
| 2016/0350591 | A1* | 12/2016 | Kraft | G06Q 20/387 |
| 2017/0371867 | A1* | 12/2017 | Hughes | G06F 40/51 |
| 2018/0047193 | A1* | 2/2018 | Gao | G06T 7/248 |
| 2018/0129899 | A1* | 5/2018 | Harron | G06N 3/0445 |
| 2018/0276493 | A1* | 9/2018 | Wang | G06K 9/00456 |
| 2019/0188463 | A1* | 6/2019 | Sodhani | G06N 3/084 |
| 2019/0220660 | A1 | 7/2019 | Cali et al. | |
| 2019/0311227 | A1* | 10/2019 | Kriegman | G06K 9/00442 |
| 2019/0354756 | A1* | 11/2019 | Goubalan | G06K 9/525 |
| 2019/0378293 | A1* | 12/2019 | Mwikirize | G06T 5/20 |
| 2020/0175053 | A1* | 6/2020 | Zheng | G06N 3/0454 |
| 2020/0184260 | A1* | 6/2020 | Lai | G06K 9/6262 |
| 2020/0226400 | A1* | 7/2020 | Corring | G06K 9/03 |
| 2021/0004584 | A1* | 1/2021 | Bildner | G06K 9/6256 |
| 2021/0034856 | A1* | 2/2021 | Torres | G06N 3/08 |

\* cited by examiner

210

```
┌─────────────────────────────────────────────────┐
│ Receive image data corresponding to a source    │
│ image that portrays text in one or more         │──── 212
│ languages, the image data comprising a          │
│ plurality of shaped image data portions         │
└─────────────────────────────────────────────────┘
                         │
                         ▼
┌─────────────────────────────────────────────────┐
│ Replace a shape of each image data portion      │──── 214
│ with a convex hull shape                        │
└─────────────────────────────────────────────────┘
                         │
                         ▼
┌─────────────────────────────────────────────────┐
│ Generate a set of bounding boxes by replacing   │
│ the convex hull shape of each image data        │
│ portion with a bounding box, wherein each       │──── 216
│ bounding box surrounds a respective image data  │
│ portion previously situated within a            │
│ corresponding replaced convex hull shape        │
└─────────────────────────────────────────────────┘
                         │
                         ▼
┌─────────────────────────────────────────────────┐
│ Merge any intersecting bounding boxes into a    │
│ merged bounding box to generate a set of        │──── 218
│ merged bounding boxes indicative of image data  │
│ portions that likely portray one or more words  │
│ of the one or more languages                    │
└─────────────────────────────────────────────────┘
                         │
                         ▼
┌─────────────────────────────────────────────────┐
│ Steps performed with respect to one or more     │──── 220
│ merged bounding boxes                           │
└─────────────────────────────────────────────────┘
```

FIG. 2B

NEURAL NETWORK-BASED OPTICAL CHARACTER RECOGNITION

CROSS-REFERENCE TO RELATED APPLICATIONS

This application claims the benefit of U.S. Provisional Application No. 62/929,648, filed on Nov. 1, 2019, which is hereby incorporated by reference in its entirety.

BACKGROUND

Software based on conventional Optical Character Recognition (OCR) techniques allow for the recognition of text within input files. Traditional OCR techniques analyze the input files and translates text that appears in the input files according to character codes, such as ASCII, in order to produce a form of the text that can be manipulated by computer systems. For example, traditional OCR allows for recognizing the graphical information in an input file and translating the graphical information into a piece of editable data that can be stored and processed, whereby the editable data accurately reflects the intended meaning or value of the graphical information. However, conventional OCR techniques have difficulty or are unable to identify words and/or sentences in input files, especially of script like languages, or where the text in the input file is handwritten.

SUMMARY

Some of the disclosure herein relates to a method, computer-program product and a system for determining image blobs from source image files, grouping the image blobs and then determining a meaning associated with the grouped image blobs via a trained machine learning network. An embodiment of the system may generate a set of bounding boxes based on reshaped image portions that correspond to image data of a source image. The system may merge any intersecting bounding boxes into a merged bounding box to generate a set of merged bounding boxes indicative of image data portions that likely portray one or more words. Each merged bounding box may be fed by the system into a neural network to identify one or more words of the source image represented in the respective merged bounding box. The one or more identified words may be displayed by the system according to a standardized font and a confidence score.

One embodiment relates to a system that processes images with embedded text data. The system identifies one or more words in image files by drawing bounding boxes around the one or more words. The system transcribes the one or more words using computer vision and deep learning approaches. An embodiment of the system may include a platform based that allows for bulk ingestion of a larger amount of source image for word or sentence determination. Given a source image, the system provides output of words identified as being portrayed by the text in the source image.

Various embodiments may include a Heuristics Engine for dynamically modifying (i.e. updating) heuristics to fine-tune identification of image blobs and/or fine-tune generation of merged bounding boxes according to a merging algorithm. The Heuristics Engine includes different types of heuristics for identification of the image blobs and generation of merged bounding boxes. The Heuristics Engine selects respective different types of heuristics that generate a highest quality score and provides the selected heuristics to optimize image blob identification and/or the merging algorithm as described herein.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 2B is a flow chart illustrating an exemplary method that may be performed in some embodiments.

DETAILED DESCRIPTION

Figure 1:
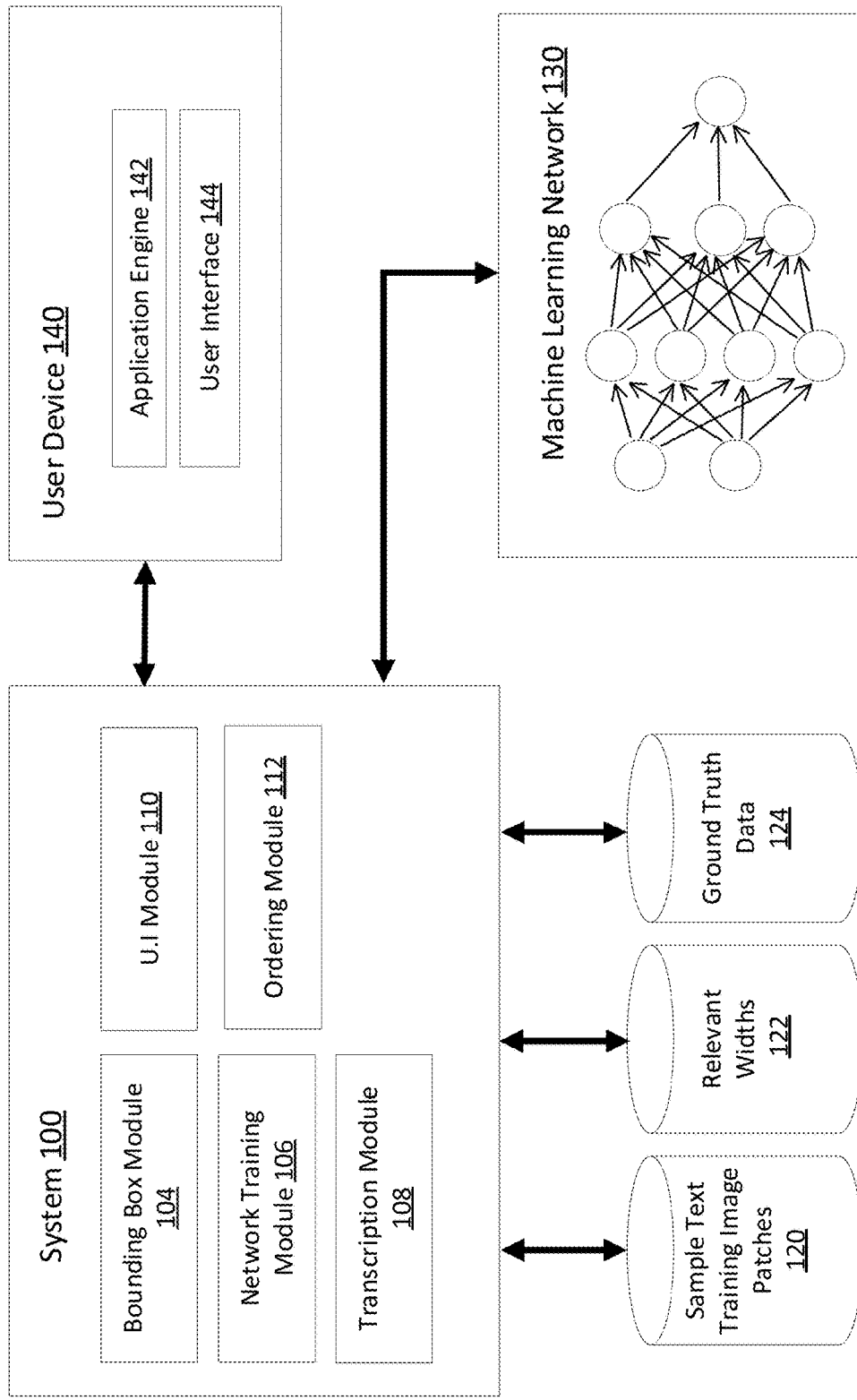
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The system allows for a bulk amount of source images as input, where each source image may include image data that portrays text (i.e. characters, words, sentences) in one or more languages. Each source image may have a different coloration and a particular script in which the text is displayed. That is, one source image may be a snapshot of a user interface in which text is displayed according to a digital font while another source image may portray handwritten text. However, both source images may have instances of the same words even though those same words may have a different appearance. For example, a handwritten word in a source image will have visual characteristics resulting from the author's physical handwriting style, whereas the same word displayed in the user interface snapshot according to a digital font will have its characters' appearance defined according to a standardized design specific only to the digital font. Nonetheless, whether portrayed according to a handwritten style or a digital font, the word has the same meaning and range of use with respect to its native language. Given the two exemplary source images, the system may identify the handwritten word's image data and the digital font word's image data as representing the same word and provide output of both instances of the word according to a consistent appearance. For each of the two exemplary source images, the system generates a transcription of the words portrayed in the image data according to a visual style of the system, so that similar words that appear in both the source images—whether handwritten or in digital font—look the same and can thereby be discerned by a reader as being the same word that happens to appear in different source images. The output of the system may further be fed into one or more translation algorithms as well. For example, the one or more identified words transcribed by the system may further be fed into a translation platform component of the system. The translation platform may generate a translation of the one or more identified words. Receipt of a translation provides confirmation that the system properly transcribed image text from source images to the one or more identified words. The translation acts as a confirmation because if the system improperly transcribed the image data, then translation system would likely be unable to match the improper transcription to a corresponding word in another language.

FIG. 1 is a diagram illustrating an exemplary environment in which some embodiments may operate. FIG. 1 illustrates a block diagram of an example system 100 of the system for training a machine learning network 130 with input training data databases that may include sample text training image patches 120, relevant widths 122 and ground truth data 124. The system 100 includes a bounding box module 104 and network training module 106, a transcription module 108, a user interface (U.I.) module 110 and an ordering module 112. The system 100 may communicate with a user device 140 to display output, via a user interface 144 generated by an application engine 142. The machine learning network 130 and the databases 120, 122, 124 may further be components of the system 100 as well.

The bounding box module 104 of the system 100 may perform functionality as illustrated in FIGS. 2A-B, FIGS. 4A-B, FIG. 5B and FIG. 9.

The network training module 106 of the system 100 may perform functionality as illustrated in FIGS. 2A-C, 5A-5B, FIGS. 6A-6B and FIG. 7 in order to train the machine learning network 130 based on training data in one or more databases 120, 122, 124.

The transcription module 108 of the system 100 may perform functionality as illustrated in FIGS. 2A, 2C, FIGS. 5A-5B, FIG. 6A-6B and FIG. 9 with respect to the machine learning network 130.

The user interface module 110 of the system 100 may perform functionality as illustrated in FIGS. 2A, 3A-B, 5A, FIG. 6A-6B and FIG. 9.

The ordering module 112 of the system 100 may perform functionality as illustrated in FIGS. 2A, 6A-B and FIG. 7. The ordering module 112 may act upon the display and logical ordering of input and output of the of the system 100.

While the databases 120, 122 and 124 are displayed separately, the databases and information maintained in a database may be combined together or further separated in a manner the promotes retrieval and storage efficiency and/or data security.

Figure 2A:
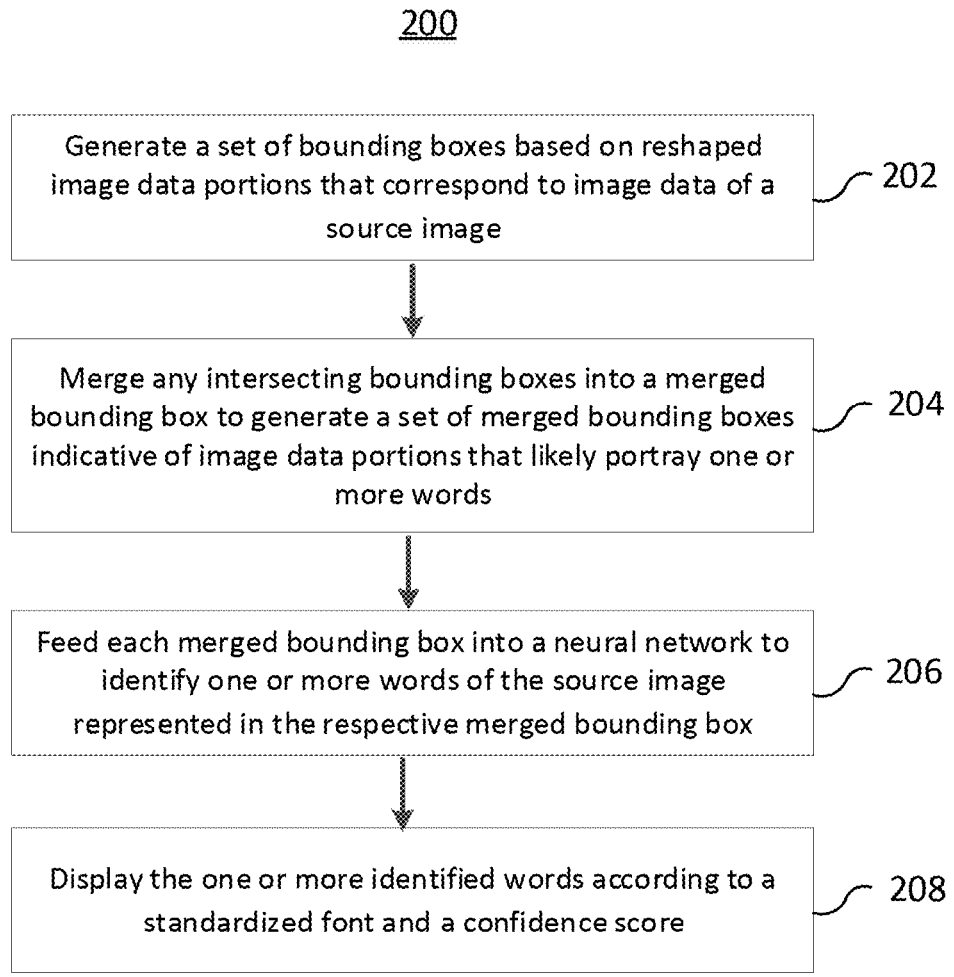
FIG. 2A is a flow chart illustrating an exemplary method that may be performed in some embodiments.

FIG. 2A is a flow chart illustrating one exemplary method 200 that may be performed consistent with an embodiment. The system 100 performing the method may generate, via the bounding box module 104, a set of bounding boxes based on reshaped image data portions that correspond to image data of a source image (Act 202). For example, the system 100 may receive image data portions. The image data portions may be individual image blobs produced from implementation of maximally stable extremal regions (MSER) on the source image. MSER is a computer vision technique for determining blobs in images. The system 100 may replace the shape of each image data portion with a rectangular shape to form a bounding box for each image data portion. For example, the system 100 may replace the shape of each MSER image blob with a rectangular shape, or other polygonal shape. The system 100, via the bounding box module 104, may generate a bounding box surrounding a portion of the image blob where the bounding box is a group of adjacent pixel encompassing the portion of the image blob.

The system 100 may merge any intersecting bounding boxes into a merged bounding box to generate a set of merged bounding boxes indicative of image data portions that likely portray one or more words (Act 204). For example, if a bounding box is positioned within another bounding box, the interior bounding box is discarded and the image data of the interior bounding box is assigned to the larger, surrounding bounding box. In other words, the bounding box module 104 may combine into a larger bounding box those smaller bounding boxes found to be contained within the larger bounding box. The bounding box module 104 compares each of the bounding boxes and determines whether the bounding box is found within another bounding box. For example, the bounding box module 104 may compare the pixel coordinates of a bounding box to the pixel coordinates other bounding box coordinates. If the bounding box module 104 determines that each of the pixels, or the outermost pixel points of the bounding box are determined to be within the another bounding box pixel boundary, then the system 100 may merge (i.e., combine) the smaller bounding box into the larger bounding box.

If boundaries of bounding boxes intersect (i.e. overlap), then the image data of the intersecting boxes are merged such the image data shares the same bounding box. For example, if the system 100 detects a sequence of ten intersecting bounding boxes, then all the image data of the ten intersecting bounding boxes will be merged together to share the same bounding box. For example, the bounding box module 104 may determine whether pixel coordinates of two bounding boxes intersect with one another. If determined to intersect, then the bounding box module 104 may merge (i.e. combine) the intersecting bounding boxes into a larger bounding box including both of the original bounding boxes. After the system 100 merges the contained or overlapping bounding boxes, total number of resulting bounding boxes will be less than the original number of bounding boxes. This merging process provides for a grouping of image data portions that are likely associated characters or words that form a semantic meaning.

The system 100 may feed each merged bounding box into a neural network to identify one or more words of the source image represented in the respective merged bounding box (Act 206). For example, each merged bounding box may be fed into a convolutional neural network that outputs vectors representing overlapping portions of the input merged bounding box. The vectors may be input into a Long Short-Term Memory (LSTM) model that returns contextually aware versions of the vectors based on the receptive field that corresponds to the merged bounding box. The contextually aware vectors may be passed to a Connectionist Temporal Classification (CTC) model that provides an identified word and a confidence score. The identified word represents the word that is most likely portrayed by the image data of the input merged bounding box. The confidence score represents an extent of how likely the identified word is actually the same word portrayed in the input merged bounding box's image data. The system 100 may display the one or more identified words according to a standardized font and a confidence score (Act 208).

Some of the steps of exemplary method 200 may be performed in different orders or in parallel. Also, the steps of exemplary method 200 may occur in two or more computers, for example if the method is performed in a networked environment some steps may be performed on different computers. Various steps may be optional.

FIG. 2B is a flow chart illustrating one exemplary method 210 that may be performed consistent with an embodiment. The system 100 performing the method may receive image data corresponding to a source image that portrays text in one or more languages, the image data comprising a plurality of shaped image data portions (Act 212).

The system 100 may replace a shape of each image data portion with a convex hull shape (Act 214). For example, the image data portions may be MSER image blobs that each have a polygon shape. The system 100 may replace the polygon shape of each MSER image blob with a convex hull shape. In an embodiment, image data (such as MSER image blob data) may be situated outside of the convex hull and such image data may be discarded by the system 100.

The system 100 may generate a set of bounding boxes by replacing the convex hull shape of each image data portion with a bounding box, wherein each bounding box surrounds a respective image data portion previously situated within a corresponding replaced convex hull shape (Act 216).

The system 100 may merge any intersecting bounding boxes into a merged bounding box to generate a set of merged bounding boxes indicative of image data portions that likely portray one or more words, or part of a word, of the one or more languages (Act 218). The system 100 may perform steps 220-1 through 220-6, as illustrated in FIG. 2C, with respect to one or more of the merged bounding boxes (Act 220).

Some of the steps of exemplary method 210 may be performed in different orders or in parallel. Also, the steps of exemplary method 210 may occur in two or more computers, for example if the method is performed in a networked environment some steps may be performed on different computers. Various steps may be optional.

Some of the steps of exemplary method 210 may be performed in different orders or in parallel. Also, the steps of exemplary method 210 may occur in two or more computers, for example if the method is performed in a networked environment. As one possible example, some steps of exemplary method 210 may occur on a local computer or on a mobile device while other steps of exemplary method 210 may occur on a remote computer. Various steps may be optional.

Figure 2C:
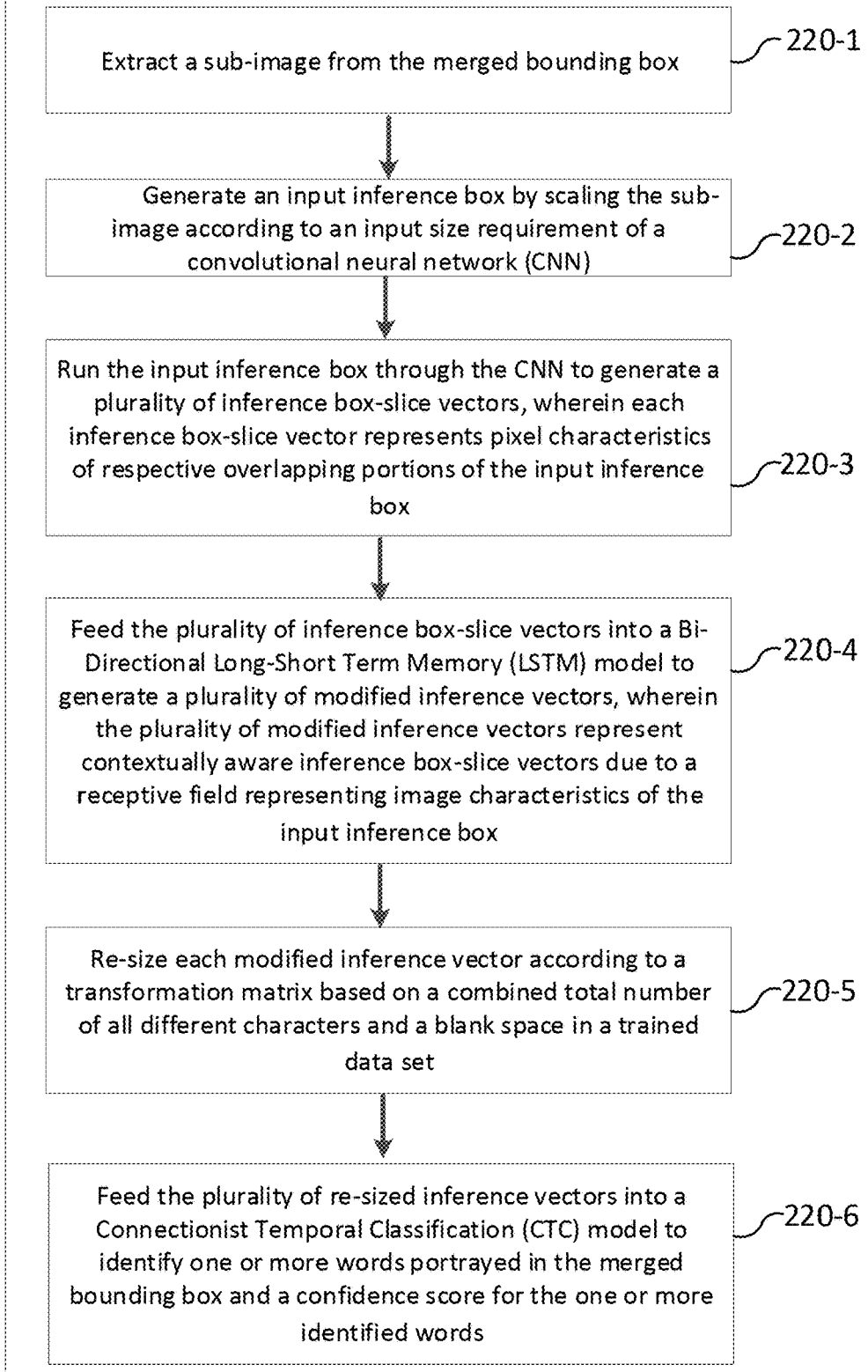
FIG. 2C is a flow chart illustrating an exemplary method that may be performed in some embodiments.

FIG. 2C is a flow chart illustrating one exemplary method 222 that may be performed consistent with an embodiment. For example, the method 222 may be performed with respect to one or more merged bounding boxes. The system 100 performing the method 222 may extract a sub-image from a merged bounding box (Act 220-1). For example, all or one or more segments of the image data may be extracted from the merged bounding box.

The system 100 may generate an input inference box by scaling the sub-image according to an input size requirement of a convolutional neural network (CNN) (Act 220-2). For example, the CNN may require image input data that satisfies one or more of a minimum input size criterion. The system 100 may scale (e.g. stretch, compress, re-size) the merged bounding box to result in a scaled version of the merged bounding box that satisfies one or more of the minimum input size criterion. The act of scaling the merged bounding box may result in creating null portions of the scaled version of the merged bounding box that have no image data. The system 100 may insert additional instances of the merged bounding box's background color into the null portions to generate an input inference box to be fed into the CNN. Depending on the result of scaling the merged bounding box, the system 100 may replace the original instances of the background color with new instances of the background color in addition to padding the null portions with the background color. In one embodiment, the system 100 may analyze an input inference box or a scaled merged bounding box to determine the readability of the image data. If the image data fails to satisfy one or more readability criterion, the system 100 may discard the input inference box or the scaled merged bounding box rather than using it as input for the CNN.

The system 100 may run the input inference box through the CNN to generate a plurality of inference box-slice vectors, wherein each inference box-slice vector represents pixel characteristics of respective overlapping portions of the input inference box (Act 220-3). For example, as result of processing the input interference box (i.e. the scaled version of the merged bounding box with null portions padded with background color) by pooling entirely across a vertical dimension, the CNN may generate one or more feature vectors, which are inference box-slice vectors. In one embodiment, the CNN may generate 64 inference box-slice vectors for each input inference box. The 64 inference box-slice vectors may correspond to overlapping image slices (i.e. segments) of the input inference box. Each inference box-slice vector thereby represents one or more pixel characteristics of a particular image slice in the input inference box that overlaps with one or more other image slices in the input inference box.

The system 100 may feed the plurality of inference box-slice vectors into a Multi-Layer, Bi-Directional Long-Short Term Memory (LSTM) model to generate a plurality of modified inference vectors, wherein the plurality of modified inference vectors represent contextually aware inference box-slice vectors due to a receptive field representing image characteristics of the input inference box (Act 220-4). The system 100 may also use Single Layer, Bi-Directional LSTM model. Additional input into the Bi-Directional LSTM model may be receptive field data corresponding to image characteristics of the input inference box. Processing the receptive field data with respect to the input inference box-slice vectors from the CNN results in modified inference vectors. Due to processing of the receptive field data, each modified inference vector represents a version of an input inference box-slice vector that is contextually aware with respect to image data that is occurs before and after those pixels represented by the modified inference vector.

The system 100 may re-size each modified inference vector according to a transformation matrix based on a combined total number of all unique characters and a special blank character in a training data set (Act 220-5). Upon generating one or more modified inference vectors, the system 100 may re-size the modified inference vectors. For example, each modified inference vector may have a [512] size and the transformation matrix may be sized based on the number of unique characters in the training data set. The amount of training data may be a total number of identifiable, unique characters in the training data set. The system 100 may apply the transformation matrix to one or more modified inference vectors to generate one or more re-sized inference vectors. The system 100 may feed the plurality of re-sized inference vectors into a Connectionist Temporal Classification (CTC) model to identify one or more words portrayed in the merged bounding box and a confidence score for the one or more identified words (Act 220-6).

Some of the steps of exemplary method 222 may be performed in different orders or in parallel. Also, the steps of exemplary method 222 may occur in two or more computers, for example if the method is performed in a networked environment some steps may be performed on different computers. Various steps may be optional.

Figure 3A:
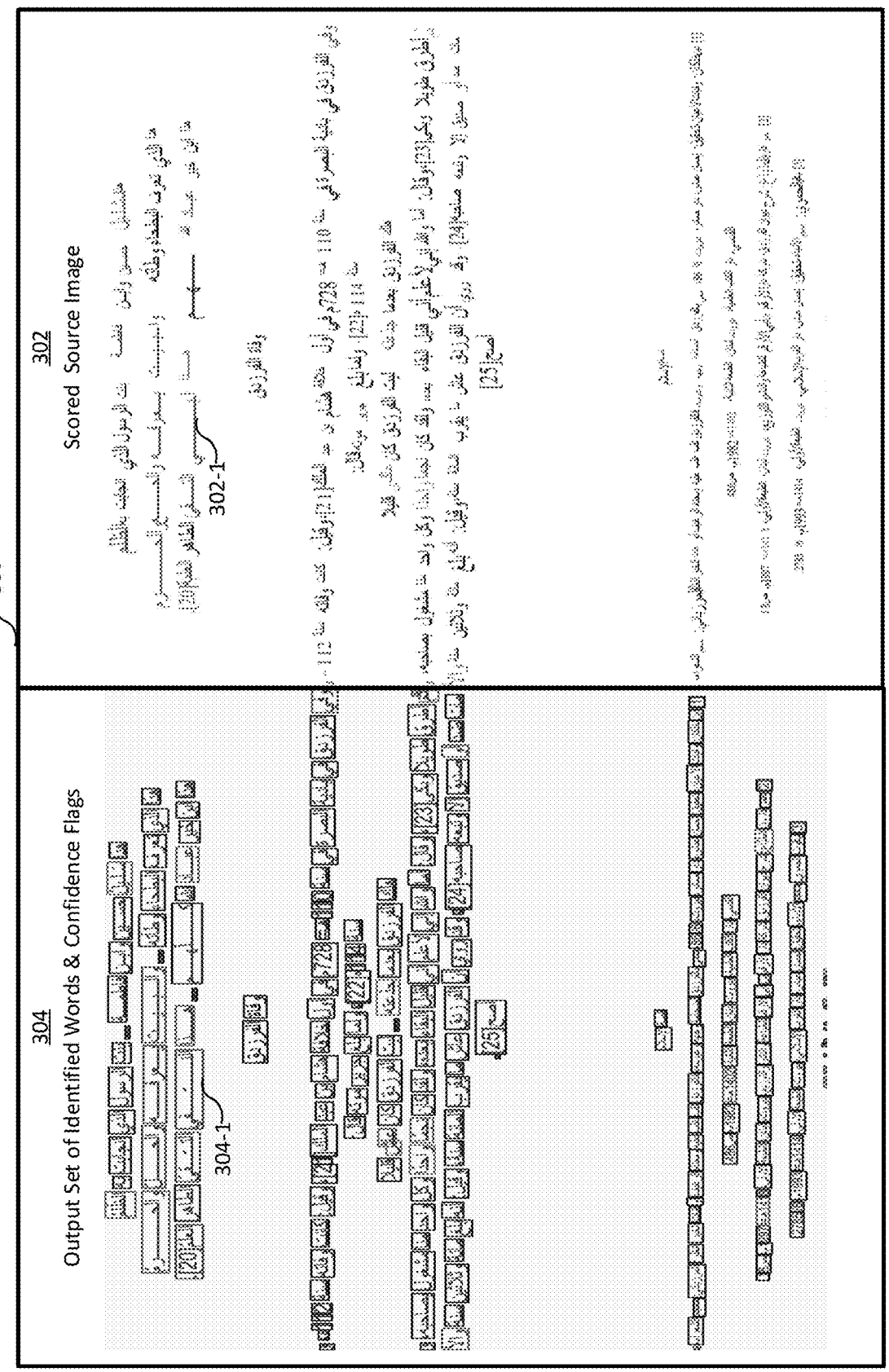
FIG. 3A illustrates an exemplary user interface that may be used in some embodiments.

As shown in FIG. 3A, an exemplary user interface 300 may be based on a scored version of a source image 302 and an output set of identified words and confidence flags 304. For example, the source image may be an image of handwritten text, the system generates a scored source image 302 that includes representations of one or more words identified as being present in the source image. For example, the scored source image 302 may include an identified word 302-1 displayed according to a standardized script format, even though that word was represented as a handwritten word in the source image. The scored source image 302 may display the identified word 302-1 according to a colored, standardized script format whereby the color corresponds to a confidence score. For example, the color may be predefined, such that the color red indicates a low confidence that the identified word 302-1 actually represents the handwritten word in the source image. Different colors may be defined to represent different confidence score ranges. The system may generate an output set of identified words and confidence flags 304. For example, the identified word 302-1 may be represented in a uniform color that is shared with all other identified words in the output set 304. The identified word 302-1 may be displayed in the output set 304 with a confidence flag that may be a confidence score box 304-1 surrounding the identified word 302-1. The confidence score box 304-1 may be displayed according to a color that corresponds to the confidence score for the identified word 302-1. In one embodiment, the user interface 300 further allows for textual search, whereby the identified word 302-1, 304-1 is searchable across both portions 302, 304 of the user interface 300 (i.e. the scored source image 302 and the output set 304). The system may further display a highlight of the placement of the image text that corresponds to the identified word 302, 304 in the input source image during textual search. The user interface 300 may further include a document selection component which provides functionality for an end user to select one or more source images for sequential transcription or concurrent transcription.

Figure 3B:
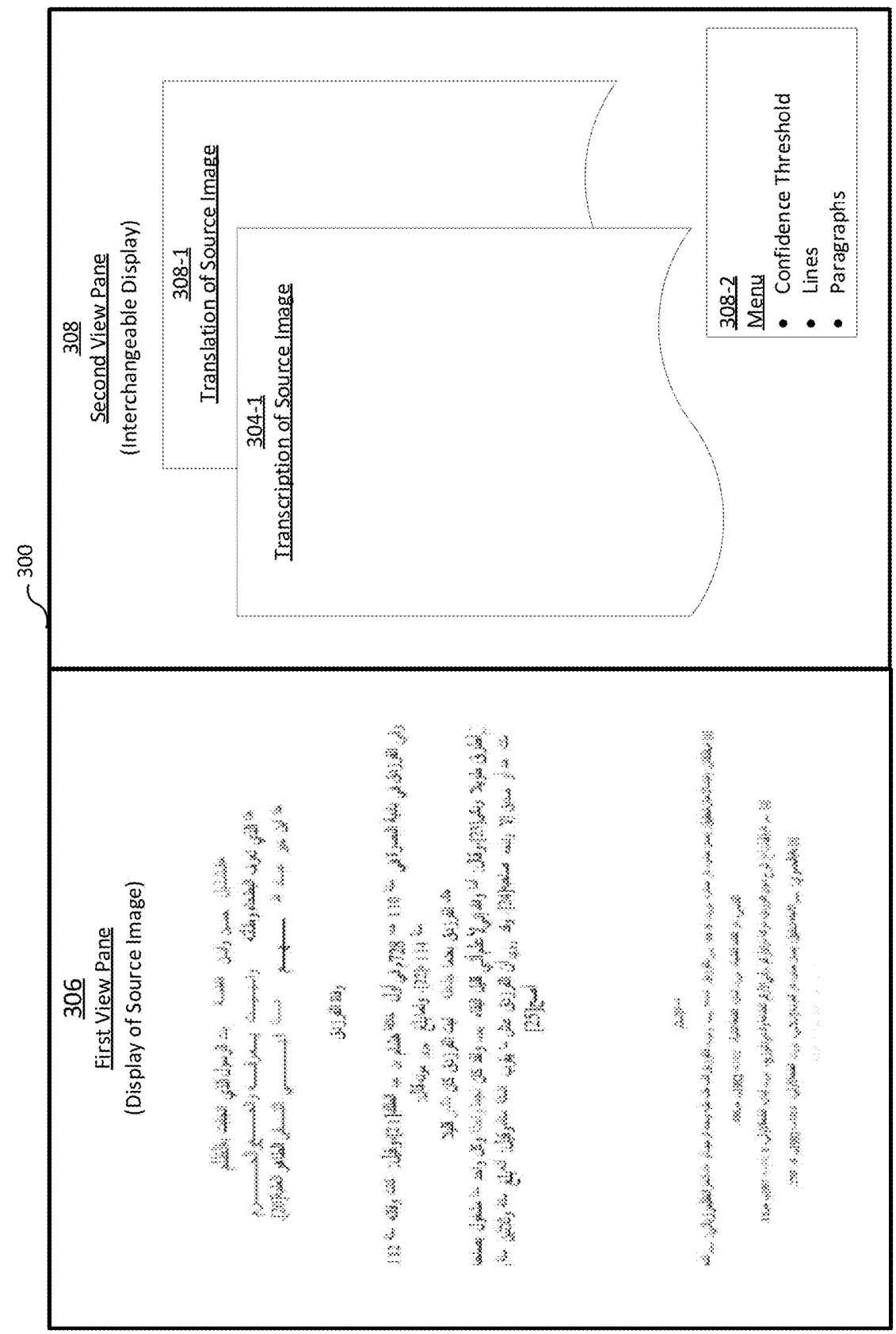
FIG. 3B illustrates an exemplary user interface that may be used in some embodiments.

As shown in FIG. 3B, another mode of the exemplary user interface 300 may include a first view pane 306 and a second view pane 308. The first view pane 306 may display the source image. The second view pane 308 provides for an interchangeable display to either display a transcription of the source image 304-1 or display a translation of the source image 308-1. In one embodiment, anything displayed in the transcription 304-1 and the translation 308-1 may be editable by an end user. The end user may toggle between both displays 304-1, 308-1 in the second view pane 308 while display of the source image in the first view pane 306 is maintained. In addition, the second view pane 308 may include a menu 308-2. The end user may adjust a confidence threshold (e.g., a value between zero to one) that is to be applied to the display of the transcription 304-1. When the confidence threshold is increased, one or more identified words in the transcription 304-1 that have respective confidence scores below the increased confidence threshold will disappear from the display of the transcription 304-1. As an identified word disappears from the transcription 304-1, the location of that identified word in the transcription 304-1 will be filled with image pixel data from a location in the source image display 306 that maps to the location of the removed, identified word. If the end user decreases the confidence threshold, the formerly removed, identified word will reappear at the same location if the removed, identified word has a confidence score that satisfies the decreased confidence threshold. The menu 308-2 may also allow the end user to toggle between display and non-display of boundaries of lines in the transcription 304-1 and in the display of the translation 308-1. Similarly, the menu 308-2 may also allow the end user to toggle between display and non-display of boundaries of paragraphs in the transcription 304-1 and in the display of the translation 308-1.

Figure 4A:
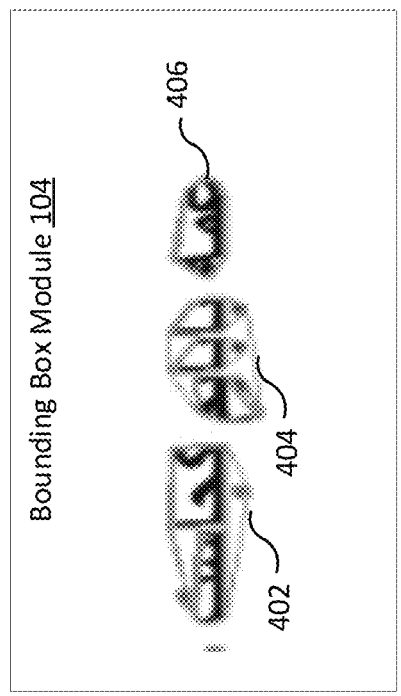
FIG. 4A is an exemplary diagram of one possible phase in some embodiments.

As shown in FIG. 4A, the system may receive multiple portions of image data, such as, for example, one or more MSER image blobs. For example, the MSER image blobs may be received as each having a polygon shape. The system may replace the polygon shaping of each MSER image blob with a convex hull 402, 404, 406. According to various embodiments, the MSER blobs may be based on one or more glyphs extracted from a .PDF document.

For example, MSER output may be one or more image blobs shaped according to a polygon. A polygon may an arbitrary collection of non-intersecting lines that encloses an image blob and typically is not convex. To generate a convex hull for an image blob, one or more vertices of its corresponding polygon shape are deleted in an iterative manner until the polygon shape has been reshaped into a convex hull that surrounds the image blob.

Figure 4B:
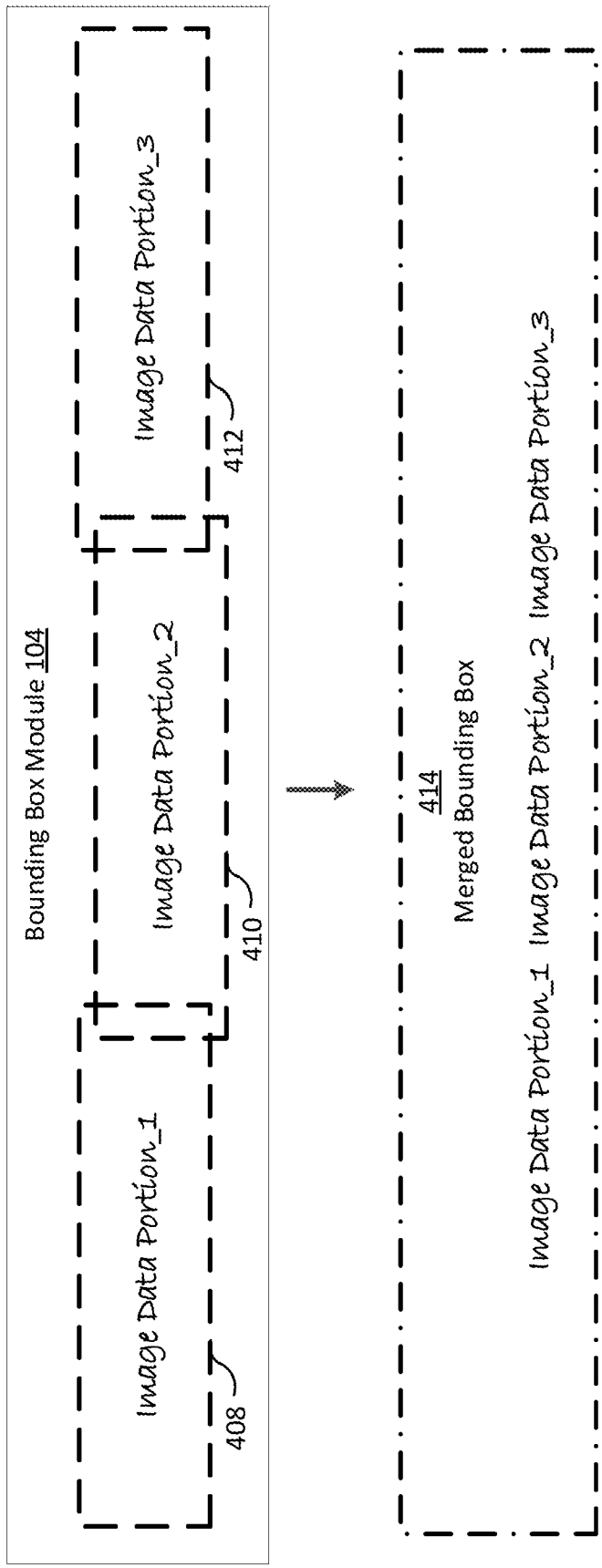
FIG. 4B is an exemplary diagram of one possible phase in some embodiments.

As shown in FIG. 4B, for a given portion of an MSER image blob that is included within a convex hull, the system will further replace the convex hull with a bounding box 408, 410, 412. Each bounding box 408, 410, 412 may include all of the corresponding MSER image blob's data that was surrounded by the replaced convex hull. Each bounding box 408, 410, 412 may be defined according to positional coordinates that represent rectangular boundaries. The system may detect that the boundaries of one or more of the bounding boxes 408, 410, 412 intersect. Based on detecting the intersecting boundaries, the system may merge the one or more of the bounding boxes 408, 410, 412 to generate a merged bounding box 414.

In one embodiment, a rectangle may be defined by the Transcriber to include two sides that are perfectly horizontal such that the other two sides are thereby perfectly horizontal. According to one embodiment, an exemplary bounding box may be defined as an instance of the Transcriber's rectangle that is the smallest possible version of the rectangle that can still encapsulate the given area of a convex hull that surrounds an MSER image blob.

Figure 5A:
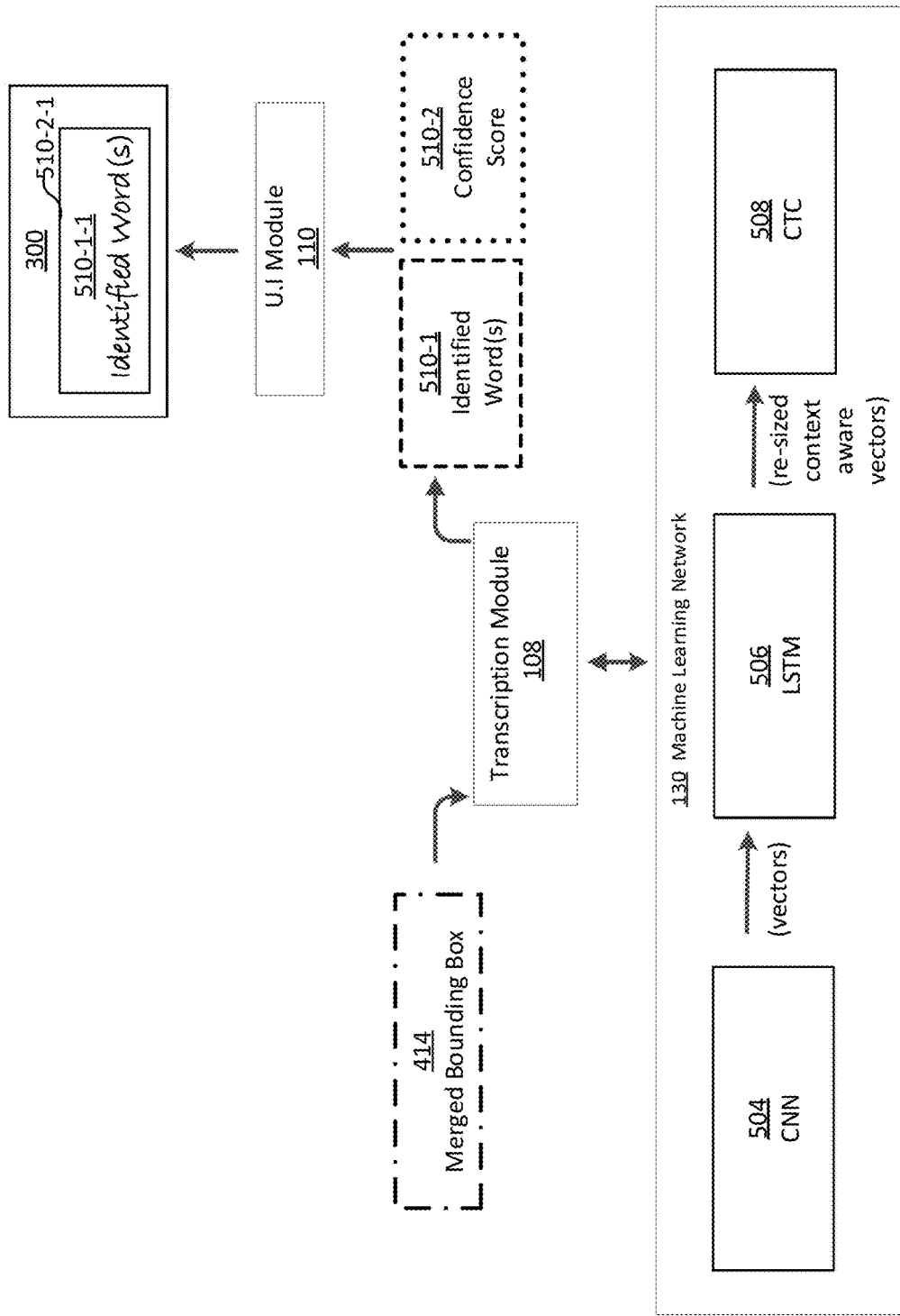
FIG. 5A is an exemplary diagram of one environment in which some embodiments may operate.

As shown in FIG. 5A, an input for a CNN 504 may be based on a merged bounding box 414. The CNN 504 generates a plurality of inference box-slice vectors based on the image data of the merged bounding box 414. The inference box-slice vectors are fed into an LSTM model 506 which generates contextually aware modified inference vectors based on receptive field data. The modified inference vectors may each be re-sized and input into a CTC model 508. The CTC model 508 may output one or more identified words 510-1 and a confidence score 510-2 for each of the one or more identified words 510-1. Each identified word 510-1 may be displayed such that a display instance of an identified word 510-1-1 appears within a confidence score box 510-2-1. The confidence score box 510-2-1 may be rendered according to a color that corresponds to the confidence score 510-2 in order to provide a visual cue as to the value of the confidence score 510-2.

Figure 5B:
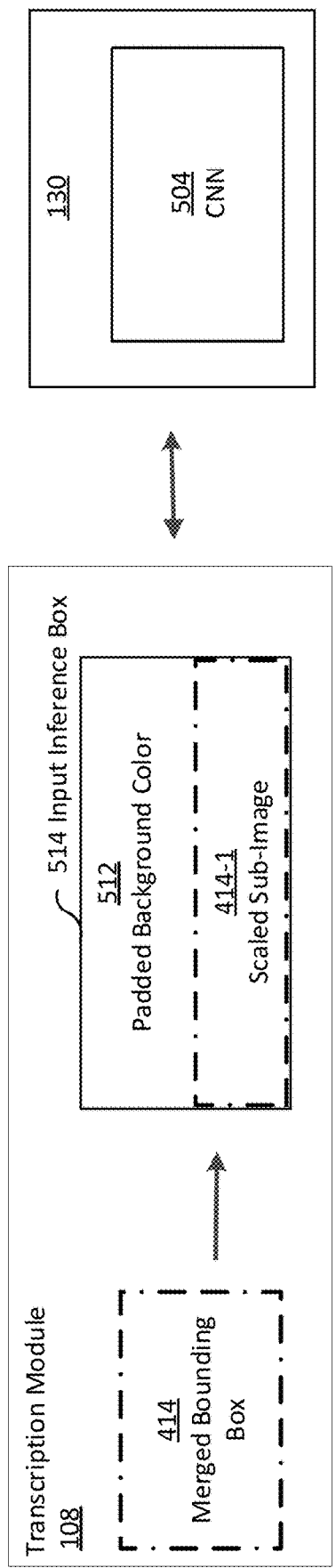
FIG. 5B is an exemplary diagram of one environment in which some embodiments may operate.

As shown in FIG. 5B, in input inference box 514 may be generated based on a merged bounding box 414. image data segments may be extracted from the merged bounding box 414 to generate a sub-image. The sub-image may be scaled according to one or more minimum input size criterion of the CNN 504. However, scaling the sub-image may result in input for the CNN 504 that is null data. The null data may be padded with the merged bounding box's 414 background color to generate the input inference box 514. Padding the null data with the background color 512 results in avoidance of a presence of an edge between the scaled sub-image 414-1 and the null portions.

Figure 6A:
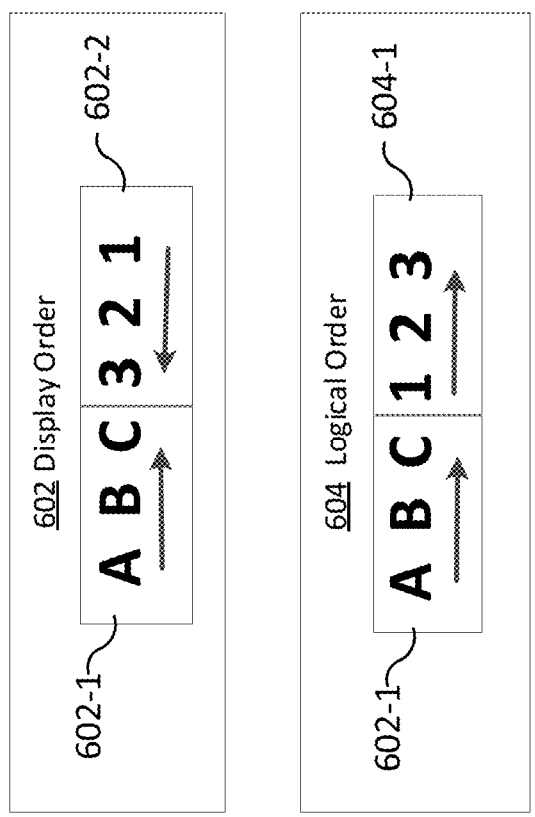
FIG. 6A is an exemplary diagram of data for some embodiments.

As shown in FIG. 6A, the system handles image data that portrays one or more languages even though some languages may have different display orders. For example, a display order 602 is a direction in which a particular language is read and written. Some languages may be read and written from left-to-right, such as text "ABC" 602-1. Other languages may be read and written from right-to-left, such as text "321" 602-2. However, given one or more input source images, the machine learning network 130 executes according to a logical order 604. That is, all input source image data is analyzed according to the logical order 604 and not display order 602. For example, the logical order 604 may be defined as reading and writing from left-to-right only. So, text "ABC" 602-1 will have a right-to-left logical order 604 that is the same as its display order 602. However, the system will process the text "321" 602-2 in reverse from its left-to-right display order 602, such that a right-to-left logical ordering of the text "321" 602-2 in the machine learning network 130 will be text "123" 604-1.

Figure 6B:
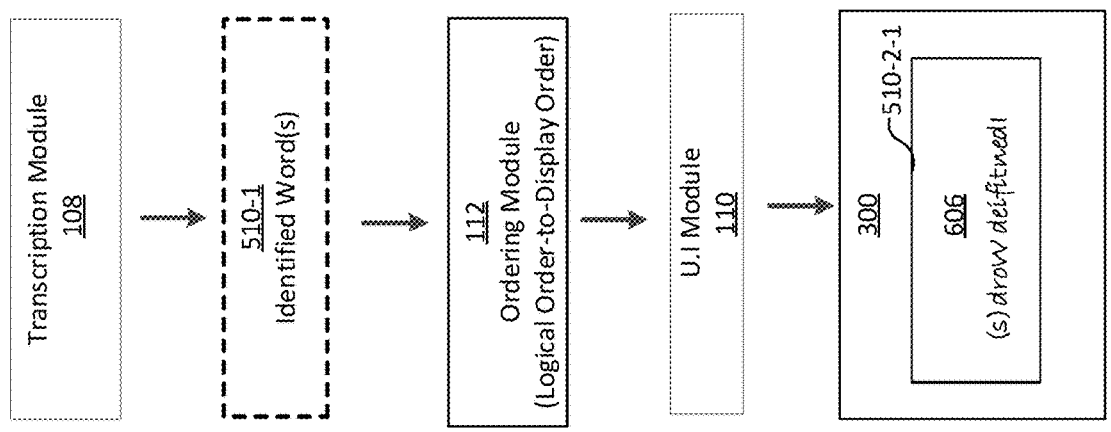
FIG. 6B is an exemplary diagram of one possible phase in some embodiments.

As shown in FIG. 6B, one or more identified words 510-1 may be from image data based on a language with a display order 602 that is right-to-left. The ordering module 112 will take the one or more identified words 510-1 as input and reverse the characters in the one or more identified words 510-1. The ordering module 112 generates a version 606 of the identified words 510-1 that appears according to the proper right-to-left display order 602 of the identified words' 510-1 native language.

Figure 7:
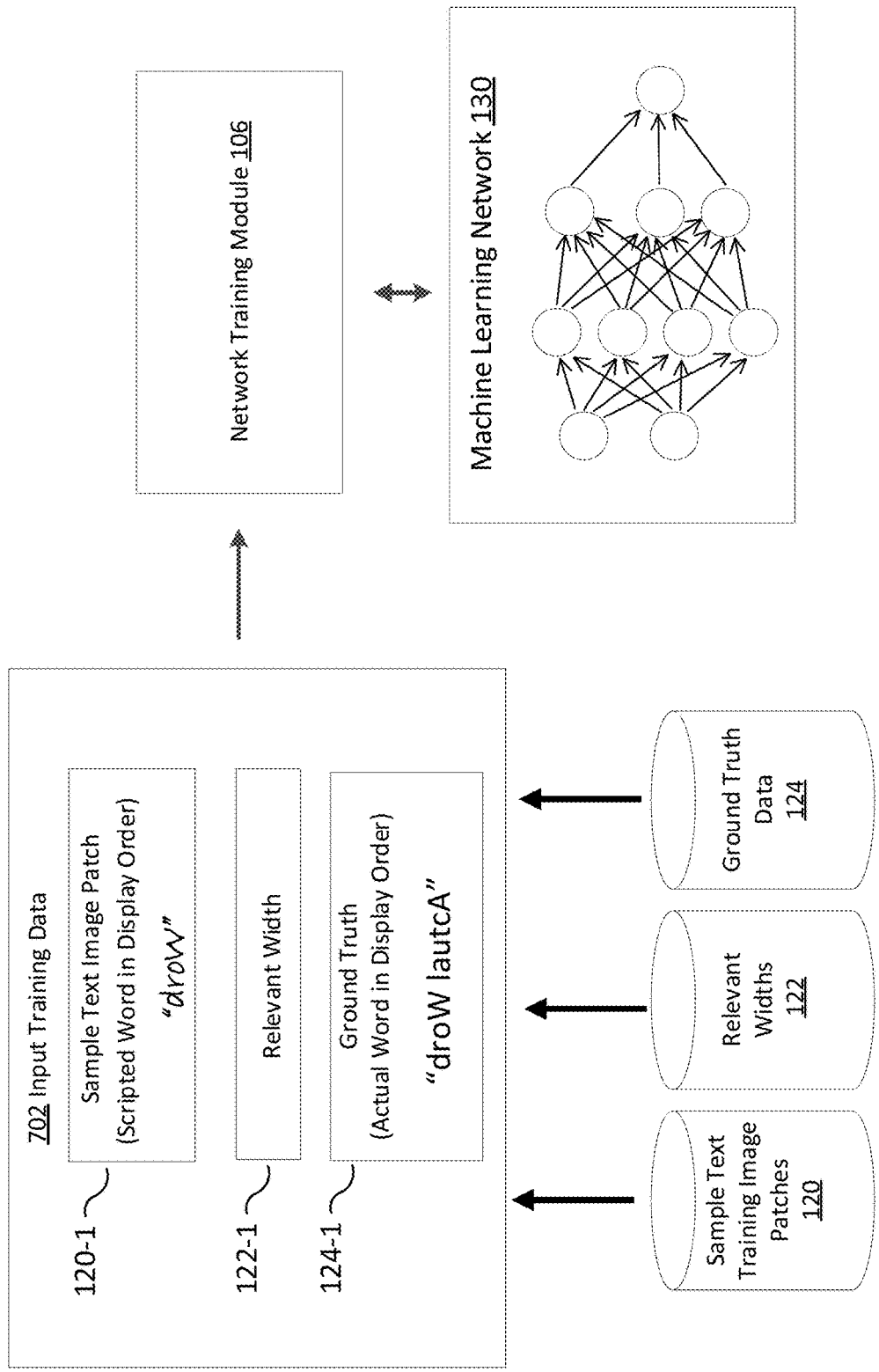
FIG. 7 is an exemplary diagram of training data for some embodiments.

As shown in FIG. 7, while the machine learning network 130 executes according to the logical order 604, the machine learning network 130 may be trained according to input training data 702 in display order 602. If a sample text image patch 120-1, upon which the machine learning network 130 will be trained, represents a word(s) in right-to-left display order 602, the input training data 702 will include ground truth data 124-1 that corresponds to the sample text image patch 120-1 in the appropriate right-to-left display order 602. The ground truth data 124-1 will be the actual word(s) that appears in the sample text image patch 120-1, and that actual word(s)—for purposes of training—will be input into the machine learning network 130 according to the right-to-left display order 602. The input training data 702 may also include the relevant width 122-1 of the sample text image patch 120-1. The relevant width 122-1 represents the pixel width of the sample text image patch 120-1 in which the portrayed word(s) (i.e. "drow") appears. It is understood that any number of sample text image patches for different words may be used to the train the machine learning network 130. In addition, the system may apply one or more transformations to each sample text image patch to generate multiple versions of each sample text image patch. Each version may include a modification of one or more visual characteristics of the corresponding original sample text image patch.

Embodiments may be used on a wide variety of computing devices in accordance with the definition of computer and computer system earlier in this patent. Mobile devices such as cellular phones, smart phones, PDAs, and tablets may implement the functionality described in this patent.

Figure 8:
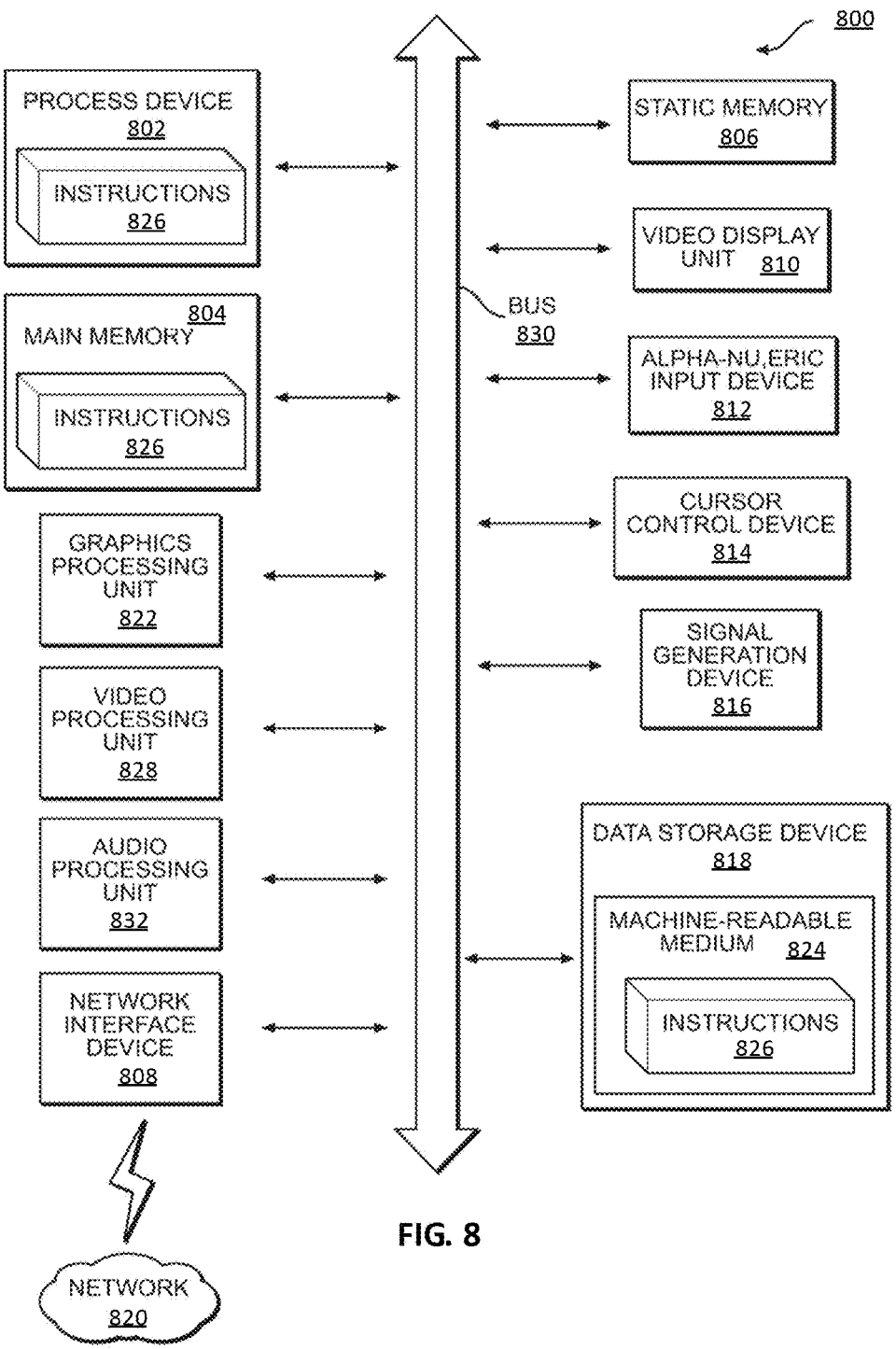
FIG. 8 is an exemplary diagram of one environment in which some embodiments may operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse) or an input touch device, a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to the components of a device to perform the disclosure herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Figure 9:
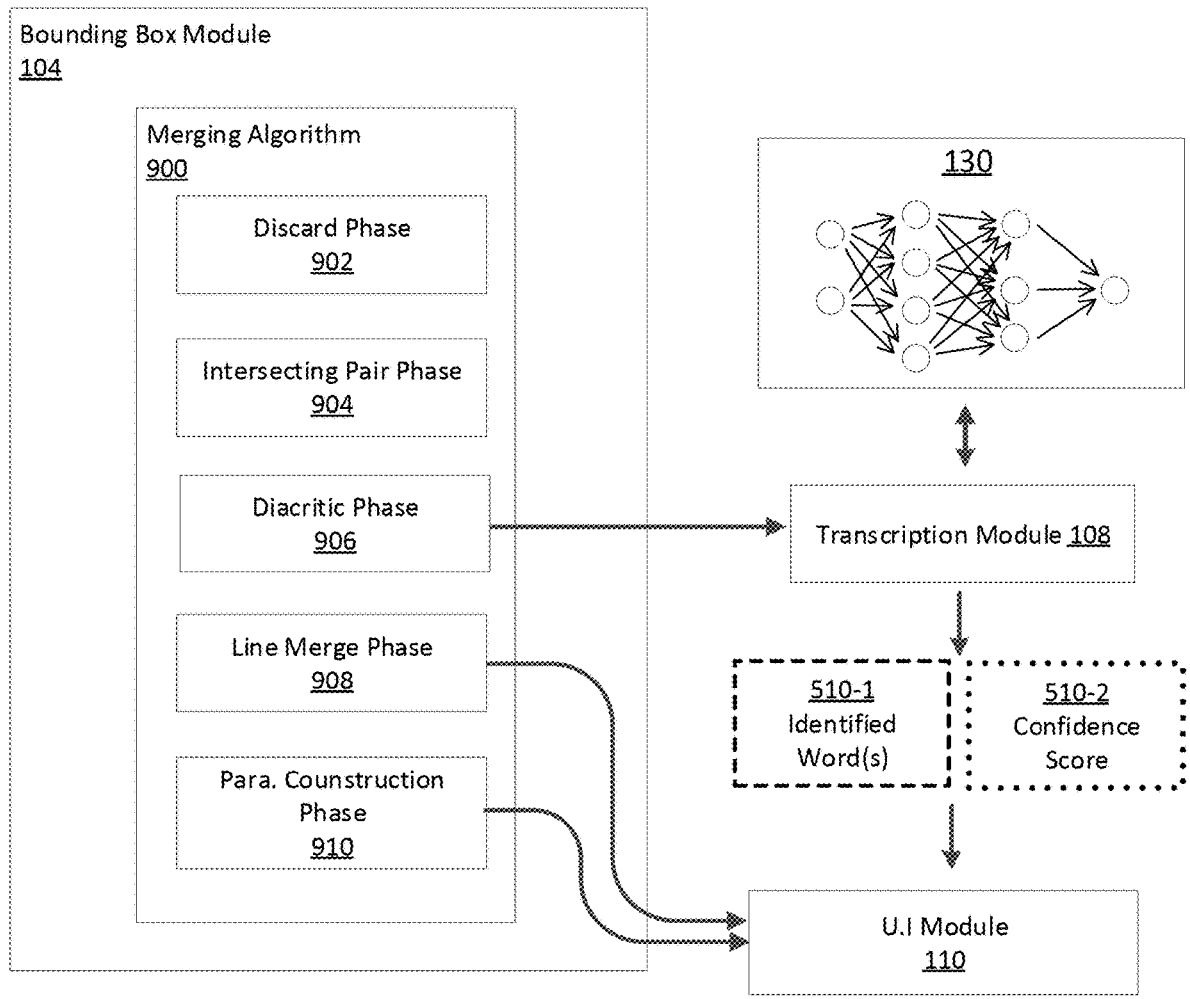
FIG. 9 is an exemplary diagram of an algorithm in some embodiments.

With regard to FIG. 9, a set of bounding boxes may be generated by the bounding box module 104, where each bounding box surrounds corresponding image data (such as an MSER image blob) of a replaced convex hull. The bounding box module 104 executes a merging algorithm 900 with the set of bounding boxes as input for the merging algorithm 900. As shown in FIG. 9, the merging algorithm 900 may have one or more phases or routines 902, 904, 906, 908, 910 executed by the bounding box module 104. In some embodiments, input to the transcription module 108 may be based in part on one or more results of the merging algorithm 900.

A discard phase 902 of the merging algorithm 900 identifies one or more bounding boxes that are fully contained within other bounding boxes and discards such-fully contained bounding boxes. All retained bounding boxes are only those bounding boxes which were not fully contained in other bounding boxes. In most cases, these retained bounding boxes may be the largest bounding boxes in the input set of bounding boxes. It is understood that the set of image pixels from the source image implicated by the retained bounding boxes is identical to the set of image pixels implicated by the input set of bounding boxes because discarding a fully-contained bounding box does not discard the image pixels from that discard, fully-contained bounding box since its image pixels are still within the boundaries of a retained bounding box.

An intersecting pair phase 904 of the merging algorithm 900 examines the retained bounding boxes to detect one or more pairs of intersecting bounding boxes that may include image data of the same instance of a possible word portrayed in the source image. Such detection may be based on various heuristics according to the geometry (e.g. boundary coordinates) and may also be based on information about the image pixels of an intersecting pair. According to various embodiments, one or more heuristics may be provided and updated by a Heuristics Engine. The bounding box module 104 identifies one or more intersecting pairs that include image pixels of a same instance of a possible word. Based on detecting image pixels of the same instance of a possible word shared between an intersecting pair, the bounding box module 104 merges the intersecting pair to generate a merged bounding box 414. A merged bounding box 414 may be generated by replacing the bounding boxes of an intersecting pair with a box that may be defined as a union of that intersecting pair. A union may further be defined, for example, as a smallest possible bounding box that still contains the image pixels of the intersecting pair. The intersecting pair phase 904 may be performed iteratively through the set of retained bounding boxes accordingly until there are no intersecting pairs of bounding boxes that implicate the same instance of a possible word.

A diacritic phase 906 of the merging algorithm 900 may use one or more additional heuristics to further merge bounding boxes if a bounding box includes image pixels of a diacritic and another bounding box includes image pixels portraying text that employs the diacritic. An example of a diacritic is the "dot" over the letter "i". According to various embodiments, the one or more heuristics may be provided and updated by the Heuristics Engine. The diacritic phase 906 ensures that non-intersecting pairs of bounding boxes are detected as implicating the same instance of a possible word are merged. For example, a diacritic may appear in a first bounding box and the corresponding text that employs the diacritic may appear in a second bounding box. Those two bounding boxes need not intersect due to a visual spacing present between the diacritic and the corresponding text. Nonetheless, the two bounding boxes are merged due to the diacritic. The diacritic phase 906 may be performed iteratively as well and the resulting set of merged bounding boxes (after execution of the intersecting phase 904 and the diacritic phase 906) may be defined as a set of word boxes. The set of merged bounding boxes may then be passed to the transcription module 108.

A line merge phase 908 of the merging algorithm 900 receives the set of word boxes as input. The line merge phase identifies one or more pairs of word boxes with one or more overlapping vertical intervals, where a vertical interval may be defined as a one-dimensional interval from the lowest point to the highest point of a respective word box. The line merge phase may apply one or more geometric heuristics to determine when a pair of word boxes should merge because they share the same visual scripting line on account of their overlapping vertical intervals. An additional heuristic may be used to determine when a space should be present between word boxes or whether the word boxes should be merged. For example, a heuristic may be based on a criteria for the number "1" which indicates how often the number "1" should be displayed alone or directly next to another character. The line merge phase 908 may be performed iteratively as well and the resulting set of merged word boxes may be defined as a set of line boxes. The set of merged word boxes may then be passed to the U.I. module 110. According to various embodiments, the one or more heuristics may be provided and updated by the Heuristics Engine. According to various embodiments, the Heuristics Engine calculates a plurality of F1 score groupings associated with a heuristic. Each F1 score grouping is related to a particular document image of a ground truth corpus. Each respective F1 score in each grouping is tied to a particular IOU cutoff score from a plurality of differing IOU cutoff scores. The Heuristics Engine generates a representative F1 score value of the heuristic for each particular document image of the ground truth corpus. The representative F1 score value of a respective document image being based on the F1 score grouping for that respective document image. The Heuristics Engine calculates a quality score for the heuristic based on an average of the heuristic's representative F1 score value for each particular document image of the ground truth corpus. The Heuristics Engine determines whether the heuristic quality score meets one or more threshold criterion. Upon determining the heuristic quality score meets one or more threshold criterion, the Heuristics Engine selects the heuristic to be utilized for identification of one or more MSER blobs and generation of merged bounding boxes in one or more subsequent incoming source images.

The line merge phase 908 may further execute line construction with respect to the line boxes. Line construction is performed in order to identify one or more sub-groups of line boxes that belong to the same visual line of the source image. For example, a visual line may be a complete or partial sentence and a particular sub-group of line boxes represents image pixels of text portrayed in the sentence. The line boxes in a sub-group may be merged together to form a merged line box. Line box merger may be based on one or more factors such a degree of similarity of height of the line boxes in the sub-group. Other factors may include: a degree of similarity of a vertical/horizontal position(s) and occurrence(s) of overlapping boxes in the sub-group. For example, an overlapping vertical position may be based on the lowest pixel of a letter, such as the hook portion of the letter "j" and the highest pixel of an upper-case letter. The lowest and highest pixels define a vertical coordinate range. Word boxes may be merged based on determining that respective text portrayed by the word boxes have vertical coordinates that overlap because the text is positioned within the same vertical coordinate range. Such merger of the word boxes thereby constructs a line of a paragraph of the source image. In one embodiment, a line of text based on a merged line box may have a transcription confidence score that is a composite of the individual confidence scores associated with the text of each line box that belonged to the corresponding sub-group. When calculating the composite confidence score, one or more individual confidence scores may not be considered if a minimum score is not satisfied. The additional results of the line construction may also be passed to the U.I. module 110.

A paragraph construction phase 910 of the merging algorithm 900 identifies one or more pairs of lines, from the line merge phase 908, that are connected. Connection between lines is detected based on respective line geometry, such as line location and line height, with regard to pixel locations of a paragraph portrayed in the source image. For example, with respect to line height, all text that appears in a particular paragraph will be portrayed according to the same font and therefore lines with text that fall within height range are added to a line graph of the same paragraph as being connected lines. Another criteria for identifying connected lines may be comparing line lengths. If a line is shorter than a line above it, then those lines are connected lines. However, if a line is shorter than a line below it, then those lines are not connected lines. In addition, a plurality of lines that include image pixels of a paragraph will be identified as connected lines of the same paragraph if there is alignment between each line and a left portion, center portion or right portion of the paragraph. For example, a paragraph in a source image will either be right justified, left justified or center justified. The paragraph will thereby have a justified coordinate that indicates a position in the paragraph that will include text (or a span of text). Connected lines will be identified as those lines that are in alignment with the justified coordinate. In one embodiment, one or more heuristics may be derived from line location(s) and line height(s). Each line that is aligned is thereby deemed a connected line that is part of a line graph of a paragraph. A paragraph confidence score may be based on one or more composite confidence scores for the lines that are part of the paragraph's line graph. The results of the paragraph construction phase 910 may then be passed to the U.I. module 110 as well.

Various embodiments may include a Heuristics Engine for dynamically modifying (i.e. updating) heuristics to fine-tune identification of MSER blobs and/or fine-tune generation of merged bounding boxes. The Heuristics Engine includes different types of heuristics for identification of MSER blobs and generation of merged bounding boxes. The Heuristics Engine selects respective different types of heuristics that generate a highest quality score and provides the selected heuristics to drive MSER blob identification and/or the merging algorithm.According to various embodiments, the Heuristics Engine calculates a plurality of F1 score groupings associated with a heuristic. Each F1 score grouping is related to a particular document image of a ground truth corpus. Each respective F1 score in each grouping is tied to a particular IOU cutoff score from a plurality of differing IOU cutoff scores. The Heuristics Engine generates a representative F1 score value of the heuristic for each particular document image of the ground truth corpus. The representative F1 score value of a respective document image being based on the F1 score grouping for that respective document image. The Heuristics Engine calculates a quality score for the heuristic based on an average of the heuristic's representative F1 score value for each particular document image of the ground truth corpus. The Heuristics Engine determines whether the heuristic quality score meets one or more threshold criterion. Upon determining the heuristic quality score meets one or more threshold criterion, the Heuristics Engine selects the heuristic to be utilized for identification of one or more MSER blobs and generation of merged bounding boxes in one or more subsequent incoming source images.

The Heuristics Engine receives a ground truth corpus that includes a document image(s) with each document image portraying one or more words. Each word may be encapsulated by a bounding box defined by a person such that the ground truth corpus is a collection of document images with corresponding human-drawn bounding boxes ("ground truth bounding boxes"). As one or more merged bounding boxes are generated, those merged bounding boxes are fed back into the Heuristics Engine to determine whether or not to update heuristics to improve MSER blob identification and/or the merging algorithm.

The Heuristics Engine compares the merged bounding boxes from a source image to the ground truth bounding boxes to determine an extent of a match between the respective bounding boxes. The Heuristics Engine defines a match between a merged bounding box in the source image and a particular ground truth bounding box according to a score computed for that bounding box pairing. For example, the score may be an Intersection over Union ("IOU") score (i.e. intersection/union) that satisfies a threshold score. The intersection may be defined as a size of the area of overlapping content shared between the merged bounding box in the source image and the particular ground truth bounding box being utilized for comparison. The union may be defined as the combined areas of the both the merged bounding box and the particular ground truth bounding box.

The Heuristics Engine determines a precision score and a recall score associated with the source image. The precision score represents a percentage of the source image's merged bounding boxes that matched to a respective ground truth bounding box. The recall score represents a percentage of the ground truth corpus that matched to the source image's merged bounding boxes. The Heuristics Engine generates an F1 score for the source image based on a combination of the precision and recall scores. The F1 score thereby represents a quality of the merged bounding boxes of the source image as compared to the bounding boxes drawn by an actual person. A source image with a low F1 score indicates the identification of the MSER blobs and/or the merging algorithm performed poorly with respect to the source image, a high F1 score indicates identification of the MSER blobs and/or the merging algorithm are operating within a degree of accuracy relatively close to a human's judgement of where a given bounding box should be placed in the source image with respect to a word.

For determining heuristic modification(s), MSER blobs and merged bounding boxes are generated for words in a source image retrieved from the ground truth corpus by applying a first set of heuristics combinations set at various first heuristic level values. Since the source image is a document image in the ground truth corpus, that same source image also has corresponding ground truth bounding boxes. The Heuristics Engine thereby compares the merged bounding boxes generated for the retrieved source document with the particular current heuristic and the ground truth bounding boxes for that same source document. For the comparisons, the Heuristics Engine selects a plurality of differing IOU cutoff scores. Since the IOU cutoff score determines whether a comparison of bounding boxes will or will not result in a match, a comparison of a first pairing of a merged bounding box and a particular ground truth bounding box may not be a match with respect to a first IOU cutoff score threshold, but may be a match with respect to a lower second IOU cutoff score threshold.

The Heuristics Engine calculates an F1 score for the source image for each respective IOU cutoff score for the first set of heuristics combinations. The Heuristics Engine repeats the described process for the first set of heuristics combinations over all the document images in the ground truth corpus such that each document image in the ground truth corpus will have multiple F1 scores. Each F1 score for a given document image will be associated with a different IOU cutoff score. For example, for the first set of heuristics combinations set at various first heuristic level values, a first document image will have multiple F1 scores, a second document image will have multiple F1 scores, a third document image will have multiple F1 scores, etc. The Heuristics Engine selects a highest F1 score for each respective document image and calculates an average F1 score based on the selected highest F1 scores to determine a quality score for the first set of heuristics combinations set a various first heuristic level values. The quality score represents the performance of the set of heuristics combinations set a various first heuristic level values across the ground truth corpus.

According to various embodiments, the Heuristics Engine may determine a quality score on a per heuristic basis. For example, the Heuristics Engine may generate MSER blobs and merged bounding boxes according to a single heuristic (H1) for each document image in the ground truth corpus. The Heuristics Engine generates a first set of MSER blobs and merged bounding boxes for a first document image according to H1, a second set of MSER blobs and merged bounding boxes for a second document image according to H1, a third set of MSER blobs and merged bounding boxes for a third document image according to H1, etc. The Heuristics Engine calculates multiple F1 scores for H1 for each document image. As such, multiple F1 scores for H1 are calculated for the first document image, multiple F1 scores for H1 are calculated for the second document image, multiple F1 scores for H1 are calculated for the third document image, etc. The Heuristics Engine generates an average, weight, or linear combination value for each respective document image based on the multiple F1 scores for H1 associated with that respective document image. The Heuristics Engine thereby calculates a representative F1 value for H1 with respect to each document image in the ground truth corpus. The Heuristics Engine calculates an average of all representative F1 values across all document images in the ground truth corpus to generate a quality score for H1. It is understood that for various embodiments, H1 may be a particular type of heuristic at a particular value, level or setting. The Heuristics Engine may also calculate a quality score for each heuristic in a plurality of heuristics. The Heuristics Engine may select one or more heuristics based on a respective quality score satisfying a criteria or threshold and the Heuristics Engine identifies the one or more selected heuristics with acceptable quality scores as heuristics to be utilized for identifying MSER blobs and generating merged bounding boxes in subsequent, incoming source images. According to other various embodiments, the Heuristics Engine calculates quality scores for the first set of heuristics combinations at various different heuristic level values and for different sets of heuristic combinations set at various different heuristic level values as well. For example, the Heuristics Engine can calculate a quality score for a first set of heuristics [Heur1(value A), Heur2 (value B), Heur3 (value C)] and a quality score for the same first set of heuristics set at different values [Heur1(value A), Heur2 (value B), Heur3 (value D)]. In addition, the Heuristics Engine can calculate a quality score for a second set of heuristics [Heur4(value E), Heur2 (value B), Heur3 (value C)] and a quality score for the same second set of heuristics set at different values [Heur4(value E), Heur2 (value F), Heur3 (value C)]. It is understood that the Heuristics Engine may calculate a quality score for a set of any number of sets of heuristics, as well as any number of different heuristic values for a given set of heuristics. For various embodiments, a set of heuristics may include a single type of heuristic as well. The Heuristics Engine identifies a particular set of heuristics (and corresponding heuristic level values) with a highest quality score and selects that particular set of heuristics to be applied (i.e. deployed) for identification of the MSER blobs and/or the merging algorithm with respect to a subsequent input source image(s).Embodiments may further include a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

Embodiments may include a machine-readable storage medium (also known as a computer-readable medium) on which is stored one or more sets of instructions or software embodying any one or more of the methodologies or functions described herein. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
 receiving image data corresponding to a source image that portrays text in one or more languages, the image data comprising a plurality of shaped image data portions;
 replacing a shape of each image data portion with a convex hull shape;
 generating a set of bounding boxes by replacing the convex hull shape of each image data portion with a bounding box, wherein each bounding box surrounds a respective image data portion previously situated within a corresponding replaced convex hull shape;
 merging any intersecting bounding boxes into a merged bounding box;
 generating a set of merged bounding boxes indicative of image data portions that likely portray one or more words of the one or more languages;
 for each merged bounding box:
  (i) extract a sub-image from the merged bounding box;
  (ii) generate an input inference box by scaling the sub-image according to an input size requirement of a convolutional neural network (CNN);
  (iii) run the input inference box through the CNN;
  (iv) generate a plurality of inference box-slice vectors, wherein each inference box-slice vector represents pixel characteristics of respective overlapping portions of the input inference box;
  (v) feed the plurality of inference box-slice vectors into a Bi-Directional Long-Short Term Memory (LSTM) model;

(vi) generate a plurality of modified inference vectors, wherein the plurality of modified inference vectors represent contextually aware inference box-slice vectors due to a receptive field representing image characteristics of the input inference box;

(vii) re-size each modified inference vector according to a transformation matrix based on a combined total number of all different characters and a blank space in a trained data set;

(viii) feed the plurality of re-sized inference vectors into a Connectionist Temporal Classification (CTC) model and identify one or more words portrayed in the merged bounding box and a confidence score for the one or more identified words.

2. A method, comprising:

generating a set of bounding boxes based on reshaped image data portions that correspond to image data of a source image;

merging any intersecting bounding boxes into a merged bounding box and generating a set of merged bounding boxes indicative of image data portions that likely portray one or more words according to a display ordering in which a respective language is read and written;

extracting image data from at least one merged bounding box;

feeding the extracted image data from at least one of the merged bounding boxes into at least one neural network;

processing, by the at least one neural network, the extracted image data according to a logical ordering native to the neural network, wherein the logical ordering differs from the display ordering;

identifying, by the at least one neural network, each one or more words of the source image represented in the extracted image data of the at least one merged bounding box; and displaying the one or more identified words according to a standardized font and a confidence score.

3. The method as in claim 2, wherein generating a set of bounding boxes based on reshaped image data portions comprises:

replacing a polygon shape of each image data portion with a rectangular shape that includes image data of the respective image data portion, wherein each image data portion comprises an maximally stable extremal regions (MSER) image blob, wherein the reshaped image data portions are based on glyphs extracted from the source image.

4. The method of claim 3, wherein replacing a polygon shape of each image data portion with a rectangular shape comprises:

for each MSER image blob:
  (i) replacing the polygon shape with a convex hull shape;
  (ii) discarding any image blob data of the MSER image blob situated outside the convex hull shape; and
  (iii) replacing the convex hull shape with the rectangular shape, wherein the rectangular shape surrounds image blob data previously situated within the replaced convex hull shape.

5. The method as in claim 2, wherein merging any intersecting bounding boxes into a merged bounding box to generate a set of merged bounding boxes comprises:

detecting plurality of intersecting bounding boxes based on overlapping boundaries; and merging the image data of the image data portions present in the intersecting bounding boxes into a shared bounding box.

6. The method as in claim 2, wherein feeding each merged bounding box into a neural network comprises:

feeding each merged bounding box into a convolutional neural network (CNN); and generating, via the CNN, a plurality of inference box-slice vectors.

7. The method of claim 6, wherein each generated inference box-slice vector represents pixel characteristics of overlapping portions of a particular merged bounding box fed into the CNN.

8. The method of claim 6, wherein feeding each merged bounding box into a CNN comprises:

for each merged mounding box:
  extract a sub-image from the merged bounding box; and
  scale a size of the sub-image to satisfy a CNN input size requirement.

9. The method of claim 8, wherein scaling a size of the sub-image to satisfy an input size requirement of the CNN comprises:

detecting one or more portions of the scaled sub-image that lack image data; and padding the detected portions with additional background color present in the scaled sub-image.

10. The method of claim 6, wherein feeding each merged bounding box into a neural network further comprises:

receiving vector output of the CNN, the vector output representative of overlapping image slices in the merged bounding box; and feeding the CNN vector output into a Bi-Directional Long-Short Term Memory (LSTM) model to generate modified vector input representing contextually aware CNN vector output based on a receptive field of the merged bounding box.

11. The method of claim 6, wherein feeding each merged bounding box into a neural network further comprises:

feeding contextually aware CNN vector output, based on a receptive field of the merged bounding box, into a Connectionist Temporal Classification (CTC) model to identify one or more words portrayed in the merged bounding box and a confidence score for the one or more identified words.

12. The method of claim 2, wherein displaying the one or more identified words according to a standardized font and a confidence score comprises:

detecting characters of the one or more identified words processed by the neural network according to the logical ordering native to the neural network.

13. The method of claim 12, wherein displaying the one or more identified words according to a standardized font and a confidence score comprises:

reversing an order of the detected characters from the logical ordering native to the neural network to the display ordering.

14. The method of claim 2, further comprising:

training the neural network with input training data comprising at least: an image patch portraying text, a relevant width of the image patch and a ground truth of the image patch indicating an actual word that corresponds to the portrayed text, wherein the relevant width of the image patch is based on a minimum width of image data within the image patch that contains the portrayed text.

15. The method of claim 14, wherein training the neural network with input training data comprises:
applying one or more transformations to the image patch to generate multiple variations of the image patch, wherein each variation of the image patch comprises a version of the image patch having a different, modified visual characteristic.

16. The method of claim 14, wherein training the neural network with input training data comprises:
training the neural network with input training data defined according to a display ordering of a respective language that corresponds with the portrayed text, wherein the display ordering represents a direction in which the respective language is read and written.

17. A system comprising:
one or more processors; and
a non-transitory computer readable medium storing a plurality of instructions, which when executed, cause the one or more processors to:
generate a set of bounding boxes based on reshaped image data portions that correspond to image data of a source image;
merge any intersecting bounding boxes into a merged bounding box to generate a set of merged bounding boxes indicative of image data portions that likely portray one or more words according to a display ordering in which a respective language is read and written;
extract image data from at least one merged bounding box;
feed the extracted image data from at least one of the merged bounding boxes into at least one neural network;
process, by the at least one neural network, the extracted image data according to a logical ordering native to the neural network, wherein the logical ordering differs from the display ordering;
identify, by the at least one neural network, one or more words of the source image represented in the extracted image data of the at least one merged bounding box; and
display the one or more identified words according to a standardized font and a confidence score.

18. A computer program product comprising a non-transitory computer-readable medium having a computer-readable program code embodied therein to be executed by one or more processors, the program code including instructions to:
generate a set of bounding boxes based on reshaped image data portions that correspond to image data of a source image;
merge any intersecting bounding boxes into a merged bounding box to generate a set of merged bounding boxes indicative of image data portions that likely portray one or more words according to a display ordering in which a respective language is read and written;
extract image data from at least one merged bounding box;
feed the extracted image data from at least one of the merged bounding boxes into at least one neural network;
process, by the at least one neural network, the extracted image data according to a logical ordering native to the neural network, wherein the logical ordering differs from the display ordering;
identify, by the at least one neural network, each one or more words of the source image represented in the extracted image data of the at least one merged bounding box; and
display the one or more identified words according to a standardized font and a confidence score.

19. A method, comprising:
generating a set of bounding boxes based on reshaped image data portions that correspond to image data of a source image;
merging any intersecting bounding boxes into a merged bounding box to generate a set of merged bounding boxes indicative of image data portions that likely portray one or more words;
feeding each merged bounding box into a neural network to identify one or more words of the source image represented in the respective merged bounding box; and
displaying the one or more identified words according to a standardized font and a confidence score;
wherein generating the set of bounding boxes and merging any intersecting bounding boxes into a merged bounding box comprises:
receiving one or more heuristics for at least one of: generating the set of bounding boxes and merging any intersecting bounding boxes into a merged bounding box;
wherein receiving the one or more heuristics comprises receiving a given a selected heuristic according to a quality score associated with a ground truth corpus, comprising:
calculating a plurality of F1 score groupings associated with a heuristic, each F1 score grouping is related to a particular document image of a ground truth corpus, wherein each respective F1 score in each grouping being tied to a particular Intersection over Union (IOU) cutoff score from a plurality of differing IOU cutoff scores;
generating a representative F1 score value of the heuristic for each particular document image of the ground truth corpus, wherein the representative F1 score value of a respective document image being based on the F1 score grouping for that respective document image;
calculating a quality score for the heuristic based on an average of the heuristic's representative F1 score value for each particular document image of the ground truth corpus;
determining whether the heuristic quality score meets one or more threshold criterion; and
upon determining the heuristic quality score meets one or more threshold criterion, selecting the heuristic to be utilized for identification of one or more maximally stable extremal regions (MSER) blobs and generation of merged bounding boxes in one or more subsequent incoming source images.

20. A computer program product comprising a non-transitory computer-readable medium having a computer-readable program code embodied therein to be executed by one or more processors, the program code including instructions for:
training at least one neural network based at least in part on image input training data, wherein at least a first portion of the image input training data corresponds to one or more languages with a left-to-right display order, wherein at least a second portion of the image input training data corresponds to one or more languages with a right-to-left display order;

determining a logical translation ordering native to the at least one neural network based at least in part on training of the at least one neural network on the first and second portions of the image input training data;

generating a set of bounding boxes based on reshaped image data portions that correspond to image data of at least one translation target source image;

merging any intersecting bounding boxes into a merged bounding box and generating a set of merged bounding boxes indicative of image data portions from the translation target source image that likely portray one or more words;

extracting image data from at least one merged bounding box;

feeding the extracted image data from at least one of the merged bounding boxes into the at least one trained neural network;

processing, by the at least one trained neural network, the extracted image data according to the logical translation ordering native to the at least one neural network; and identifying, by the at least one trained neural network, each one or more words of the translation target source image represented in the extracted image data of the at least one merged bounding box.

* * * * *